(12) United States Patent
Pellerin

(10) Patent No.: US 11,893,028 B2
(45) Date of Patent: Feb. 6, 2024

(54) SYSTEM AND METHOD FOR INTERACTIVE AND AUTOMATED DATA PROCESSING FROM DISPARATE DATA SOURCES

(71) Applicant: Shore Alliance Group Inc., Panama City Beach, FL (US)

(72) Inventor: Keith Pellerin, Panama City Beach, FL (US)

(73) Assignee: Shore Alliance Group Inc., Panama City Beach, FL (US)

( * ) Notice: Subject to any disclaimer, the term of this patent is extended or adjusted under 35 U.S.C. 154(b) by 38 days.

(21) Appl. No.: 17/112,977

(22) Filed: Dec. 4, 2020

(65) Prior Publication Data

US 2022/0179867 A1 Jun. 9, 2022

(51) Int. Cl.
| | |
|---|---|
| *G06F 16/00* | (2019.01) |
| *G06F 16/2455* | (2019.01) |
| *G06F 16/21* | (2019.01) |
| *G06F 9/54* | (2006.01) |
| *G06F 16/25* | (2019.01) |

(52) U.S. Cl.
CPC ........ *G06F 16/24564* (2019.01); *G06F 9/541* (2013.01); *G06F 16/211* (2019.01); *G06F 16/219* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 10,929,122 B1* | 2/2021 | Goodwin | G06F 8/656 |
| 2007/0203931 A1* | 8/2007 | Ukelson | G06F 16/88 |
| 2009/0094273 A1* | 4/2009 | Uchida | G06F 16/84 |
| | | | 707/999.102 |
| 2011/0087683 A1* | 4/2011 | Paparella | G06F 16/214 |
| | | | 707/756 |
| 2013/0066832 A1* | 3/2013 | Sheehan | G06Q 10/00 |
| | | | 707/634 |
| 2017/0061027 A1* | 3/2017 | Chesla | G06F 16/955 |
| 2020/0356575 A1* | 11/2020 | Krishnan | G06F 8/65 |
| 2021/0019612 A1* | 1/2021 | Carrasco | G06N 5/01 |
| 2021/0049183 A1* | 2/2021 | Ramanathan | G06Q 30/0201 |
| 2022/0129798 A1* | 4/2022 | Chintalapati | G06Q 10/067 |
| 2022/0179867 A1* | 6/2022 | Pellerin | G06F 9/541 |

* cited by examiner

*Primary Examiner* — Hasanul Mobin
(74) *Attorney, Agent, or Firm* — Morgan, Lewis & Bockius LLP

(57) ABSTRACT

A system and method process data transformation between disparate legacy systems of providers by maintaining databases of schema, rules and work flows applicable to the providers and allowing administrators to interactively customize data transformations from unique versions of data sets in one data type and format to other unique versions in other data types and formats in an automated manner, based on schema, rules and workflows. The process is controlled though an interactive user interface.

8 Claims, 6 Drawing Sheets

SYSTEM AND METHOD FOR INTERACTIVE AND AUTOMATED DATA PROCESSING FROM DISPARATE DATA SOURCES

FIELD OF THE INVENTION

The present invention relates generally to data processing systems and, more particularly, to data processing systems that automatically and interactively process data sets from disparate legacy systems to transform the data sets, using schema, interrogation, rules, workflows and interaction with an administrator through an application programming interface, from legacy formats into unique data set versions having standardized and/or other legacy formats.

BACKGROUND OF THE INVENTION

Internet and network connectivity have expanded rapidly to facilitate sharing information between organizations and other entities. In many cases, information stored in standardized formats and can be made available seamlessly to other organizations and entities via the Internet using standard tools and techniques.

By contrast, information that has historically been stored in legacy systems of organizations is stored in non-standard formats and is not easily shared outside of the organization. Such information presents challenges to organizations that need to collaborate, even while using their respective, incompatible legacy systems. Because information stored in legacy systems is stored with its own format, that presents a challenge to making the information easily available to others. Legacy systems may implement data processing steps and formats for data sets that are opaque and incompatible with other systems that would otherwise be able to beneficially use such legacy information.

In the insurance industry, for example, there are hundreds of legacy systems that support dozens of different file types, data formats and data structures. For example, benefits administrators charged with enrollment administration use legacy systems to store enrollment data for employees in a myriad of different data set formats and schema. Insurance companies that provide insurance have their own, separate legacy systems that are typically incompatible with the benefit administrator systems in file types, and data formats. There is, however, no common data format that all insurance industry participants use and there is no easy way to share data across platforms.

Accordingly, there is a need for a platform that can ingest data in different formats and file types from legacy systems and make it available to different service providers. There is a further need for the platform to handle many different data schema, formats and rules and to learn different data formats to facilitate ingesting and transforming new and different data sources to enable data sharing in an automated manner. There is a further need for an automated system and method that allows disparate organizations to share data in their own legacy formats without updating their own systems, and allow that information to be efficiently used by others.

SUMMARY OF THE INVENTION

According to an embodiment of the present invention, an interactive and automated data processing system and method are provided that ingest data sets in different formats, translate and store the data sets into a standard format based on a variety of criteria including product rules, case rules and workflows, and export the data sets in different formats to third parties. The data sets are tagged with version numbers to facilitate tracking. Schema and workflows are also versioned. An interface allows administrators to identify and import data sets from any legacy system in any format, translate in an automated manner the imported data sets into a standardized format, and process the data sets based on product rules, case rules and work flows. This allows data storage, transformation and output of precisely controlled data set versions to a variety of different legacy systems in file types and data formats used by the respective legacy data systems. In the insurance industry, the automated data processing systems and methods described here will facilitate the ingestion of data sets from over 300 legacy systems into standard formats for group benefits enrollment and administration and facilitate insurance operations between insurance companies and group benefits partners.

According to one embodiment of the invention, a method of automated data processing between disparate data systems using different schema, includes: (i) ingesting, based on input from an administrator, a data set having a schema and stored as a first data type, (ii) applying a version identifier to the data set, (iii) interrogating the data set to verify the schema, (iv) transforming the data set into a standardized data set based on a standardized mapping and standardized data type, and (v) applying a version number to the standardized data set. The method further includes (vi) outputting the data set into additional schema and data types based on interaction with the administrator, wherein the administrator is alerted to errors in transformation and completed transformations via an interactive user interface. The administrator may be interactively presented with a work flow editor to enable the administrator to identify and modify product or case rules applicable to transforming the data sets.

According to another embodiment of the present invention, a system for automated data processing between disparate data systems using different schema, comprises an automated data processing engine, an interactive API and provider databases. The interactive API is coupled to the automated data processing engine and administrators using computers at entities having disparate data systems. The provider databases are coupled to the engine and the API and store schema, data set versions, rules, and workflows for each provider. The automated data processing engine is configured to: (i) ingest a data set with a schema and a first data type based on input from an administrator via the API; (ii) apply a version identifier to the data set; (iii) interrogate the data set to verify the schema; (iv) transform the data set into a standardized data set based on a standardized mapping and standardized data type; (v) apply a version number to the standardized data set; (vi) output the data set into additional schema and data types based on interaction with the administrator. The API is configured to interact with an administrator to alert the administrator to completed transformations via an interactive user interface.

BRIEF DESCRIPTION OF THE FIGURES

The above described features and advantages of the present invention will be more fully appreciated with reference to the appended drawing figures described below.

DETAILED DESCRIPTION

According to an embodiment of the present invention, an interactive and automated data processing system and method are provided that ingest data sets in different formats, translate and store the data sets into a standard format based on a variety of criteria including product rules, case rules and workflows, and export the data sets in different formats to third parties. The data sets are tagged with version numbers to facilitate tracking. Schema and workflows are also versioned. An interface allows administrators to identify and import data sets from any legacy system in any format, translate in an automated manner the imported data sets into a standardized format, and process the data sets based on product rules, case rules and work flows. This allows data storage, transformation and output of precisely controlled data set versions to a variety of different legacy systems in file types and data formats used by the respective legacy data systems. In the insurance industry, the automated data processing systems and methods described here will facilitate the ingestion of data sets from over 300 legacy systems into standard formats for group benefits enrollment and administration and facilitate insurance operations between insurance companies and group benefits partners.

Figure 1:
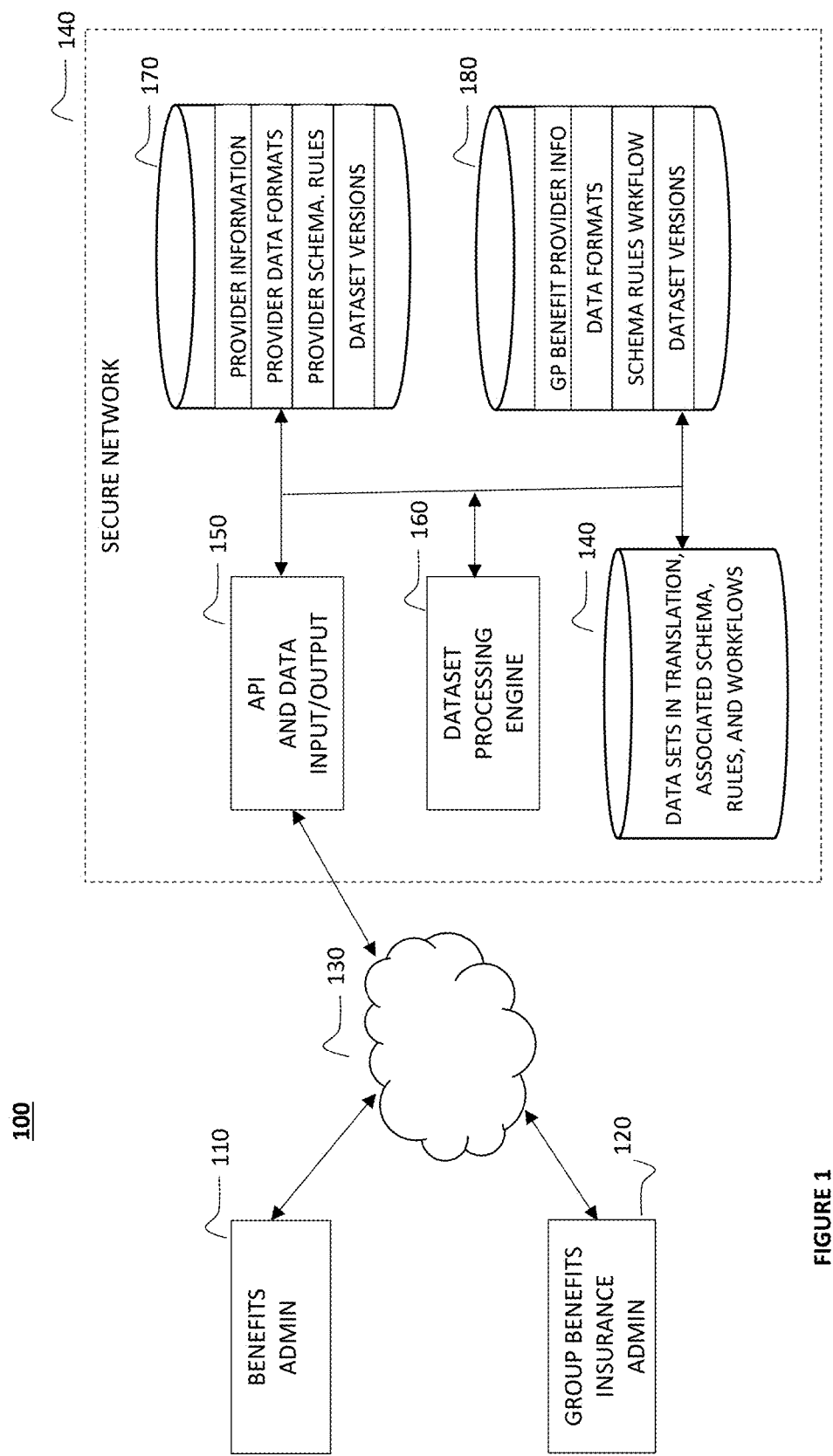
FIG. 1 depicts a functional block diagram of a data processing system according to an embodiment of the present invention.

FIG. 1 depicts a functional block diagram of a data processing system according to an embodiment of the present invention. Referring to FIG. 1, the system illustratively includes a benefits administrator 110 and a group benefits administrator 120 at computers coupled via the Internet or other networks 130 to a secure network 140. The network 140 may include an application programming interface (API) 150, coupled with a data processing engine 160, a database 140, a provide database 170 and a group benefits provider database 180.

The API 150 may be a computer or server that executes program instructions to implement an application programming interface and input/output operations in communication with administrators at the Admin computers 110 and 120 via a computer network or the Internet. The API allows administers to be presented with information and then launch the automated processing of datasets as described here, including by identifying and ingesting data sets into the data processing system 140, identifying and editing applicable workflows, applying product rules and cases, editing any inconsistencies identified by the data processing system, and identifying organizations to which to send data sets after automated processing has been completed. Administrators, via the API, may select automated data processing tasks to perform, which in turn are performed by the automated data processing engine 160.

The automated data processing engine 160 performs data processing operations on data sets ingested into the system in their legacy system formats and on data sets stored within the system that have already been converted to standardized versions. The automated data processing engine 160 accesses the provider and group benefits provider database 170 and 180, respectively, to retrieve provider information, applicable provider data formats, applicable schema, rules and workflows, and data set versions. The automated data processing engine, acts on commands received from administrators to automatically process identified data sets to create standardized data sets and to create data sets to be sent to one or more benefits administration providers or group benefits insurance providers. The unique data sets are created by translating between data formats and schema, and applying rules and workflows. The database 140 may store information created or used by the automated data processing engine, including during intermediate steps in the data transformation process. The final versions of data sets may be stored in databases 170 and 180, together with any new schema, rules or workflows created.

The provider database 170 may store information for each service provider, such as a benefits administration entity, which collects benefits enrollment information for employees in a variety of insurance programs. While benefits administration providers provide an example of organizations that have hundreds of different legacy systems and data formats that make the sharing of information between different benefits providers extremely time consuming and error prone, embodiments of the present invention are not limited to benefits administration. Rather, embodiments of the present invention are preferably applicable to any type of data processing application involving conversion between file types, data formats and database schema in which a wide variety of file types, formats and schema are expected.

The provider database 170 may further include information on the types of data formats used by particular providers, including .csv, json, xml, text, or pipe delimited. It may further include information about data schemas that the provider uses for its datasets, including information on columns, values, delimiters and other information needed to identify how data is stored in the data sets and how it may be mapped or converted into other schema. The database 170 may also store rules that are applied to values in data sets or information or logic related to how to use the data set for each provider. There may be multiple versions of schema and rules that are each identified with a different version number for each provider. The database also stores, for each provider, data set versions that have been ingested and/or converted into standardized data sets for that provider. Each data set has a version number. Data sets that are output to a provider may also be stored as a data set version for that provider.

The database 180 may store information for each group benefits provider, such as an insurance company. In general, the database 180 may be any organization that interacts with different entities that collectively store information in many different data systems with different data formats, schema and rules. The group benefits provider database 180 may store format information on the file types, such as .csv, json, xml, text, or pipe delimited, and data formats used by the group benefits provider. It may further include information about data schemas that the provider uses for its data sets, including information on columns, values, delimiters and other information needed to identify how data is stored in the data sets and how it may be mapped or converted into other schema. The database 180 may also store rules that are applied to values in datasets. Rules may also specify how to use the data set or portions thereof. The database may further store workflows for each provider that describe how to process data sets, apply rules and perform other tasks for that provider. There may be multiple versions of schema, rules and workflows that are each identified with a different version number. This allows the automated data processing system, as well as administrators, to select particular schema, rules and workflows when processing data sets. The database also stores data set versions corresponding to each data set version that has been ingested for each provider and/or converted into a standardized data set for that provider. Each data set has a version number. Data sets that are output to a provider may also be stored as a data set version available for that provider.

The organizational administrator 110 interacts with the secure network 140 to access the network and API 150 and to perform the automated data processing tasks described herein to facilitate data transfer between entities that are participants in the system. The secure network 140 may be a platform provider, cloud service provider or subscription service provider. The secure network 140 may require that administrators 110, 120 and an organizational administrator of the platform have current credentials in order to access the system. Each benefits administrator for a particular service provider may have credential stored in the database 170 for that service provider, for example.

The administrator 120, similar to the administrator 110, interacts with the secure network 140 to access the network and API 150 to perform automated data processing described herein through credentialed access. The API may be configured to send alerts to the administrators 110 and 120 when data processing tasks are complete, or when an automated data set transformation task identifies errors in the automated transformation that require review.

Figure 2:
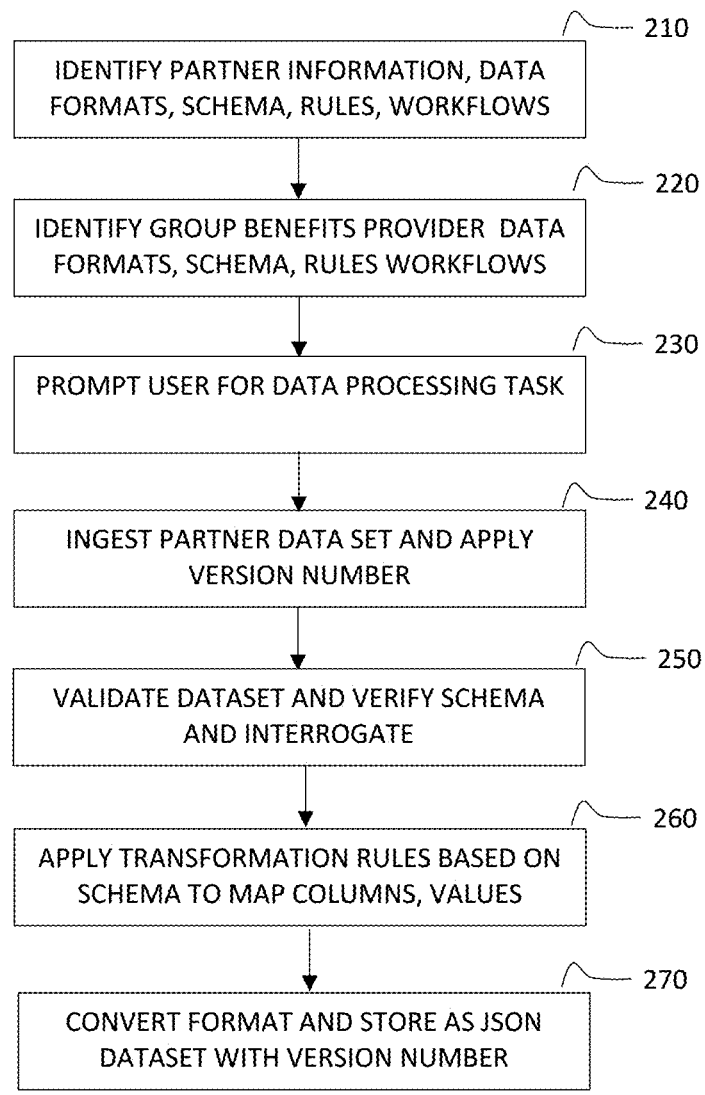
FIG. 2 depicts a method of automated processing and versioning of datasets according to an embodiment of the present invention.

FIG. 2 depicts a method of automated processing and versioning of data sets according to an embodiment of the present invention. Referring to FIG. 2, in step 210, the system identifies partner information, data formats, schema, rules and work flows from the provider database 170 that are available for automated data processing operations. In step 220, the system identifies group benefits provider data, formats, schema, rules and workflows that are available for automated data processing applications. In step 230, the system API prompts a user of the administrator terminal 110 or 120 for a data processing task. In step 240, in response to an administrator's action, the system ingests a data set identified by the administrator to the system, either through the API or via file transfer to the system. The system applies a version number to the ingested data set. The data set version may be stored in any of the databases 140, 170 or 180, but is typically associated with the provider from which the data set came in the database 170 or 180.

In step 250, the system validates the data set chosen and verifies the applicable schema. The data processing engine interrogates the data set based on the applicable schema and identifies any errors in processing that need to be addressed by the administrator. In the data interrogation process, previously consumed product rules are combined with previously consumed case rules. The product rules may include, for example, governing parameters of an allowed product set such as the product's maximum benefit amount, dependent coverage allowance, etc. The case rules may include, for example, underwriting offer and guidelines uniquely approved for an employer group, such as whether the case is a takeover or not, coverage for employees only, employee and spouse or employee and whole family. The combination of product and case rules may then be applied to interrogate every enrollment record present in the enrollment dataset.

The interrogation may return one of two outcomes:
a) The record is in good order (IGO) because it meets all case and product rules. In that instance it may be automatically passed to a carrier's policy admin system enabling the issuance of a policy certificate (coverage evidence for that employee and his/her covered members). This auto certificate generation may be enabled by the platform through an API configuration.
b) The record is not in good order (NIGO) due to one or more errors. In this case, the record may be pended, with the errors listed. The original submitter or another person authorized to address the issue may be automatically notified by the platform with an email or other message of the number of NIGO records and their error codes. This enables the original submitter to correct errors and re-submit (or the carrier's platform user to correct the errors and reprocess. As an example with this scenario, assuming 20k enrollment records come from an employer group in a benefits administration enrollment file. The interrogation process clears 19,800 records as IGO, which are passed to policy admin system in that system's required format and coverage certificates are issued. The remaining 200 may be pended. For example, 120 may be pended for reasons X, Y and Z; 40 may be pended for reasons X, A and B and 40 may be pended for reason B. Using pre-populated contact info, the original file submitter (benefits administration enrollment platform) may be automatically notified, via email link or other form of message, of the counts and reason or error codes for the pended records. That contact can make adjustments to the pended records and re-submit. At the conclusion of the interrogation process, the records are consistent with the product and case rules. In step 260, transformation rules are applied to the data set version ingested by the system. The data processing engine maps columns and values from the data set version ingested into a second schema identified by the system. The data set in step 270 is then converted into one or more data types and stored in or more processed data sets with unique version numbers. The data types may be a standard data type, such as JSON, when the data set is to be stored on the system in standardized form. Alternatively, the data type may be another data type such as .csv, xml or another data type which will be used by the recipient of the processed data. The data sets may be stored in any of the databases 140, 170 or 180 for further processing by the system and administrators.

Figure 3:
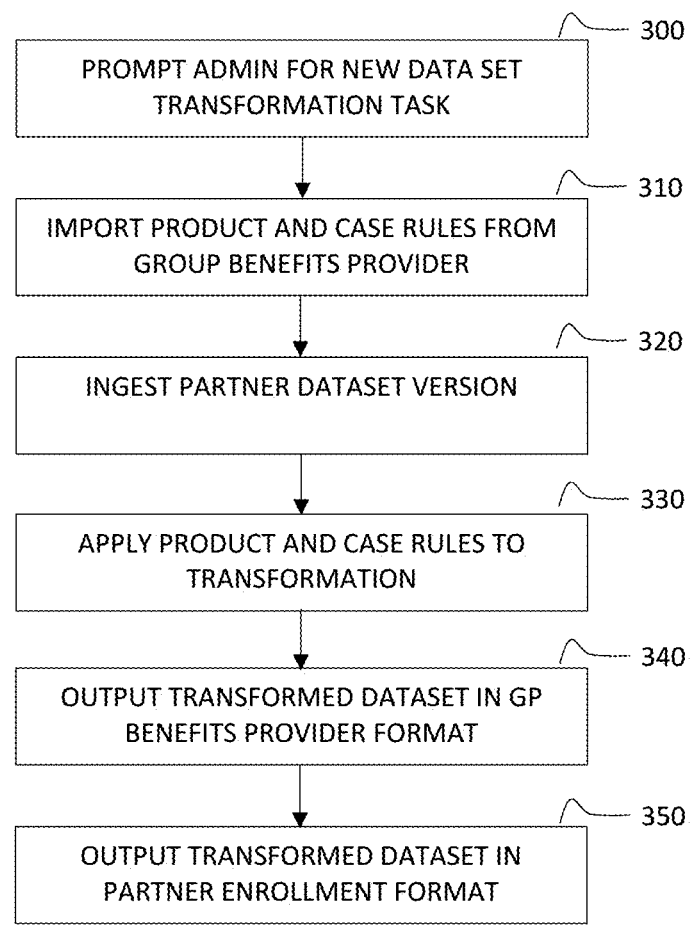
FIG. 3 depicts a method of automated processing and versioning of datasets using product and case rules according to an embodiment of the present invention.

FIG. 3 depicts a method of automated processing and versioning of datasets using product and case rules according to an embodiment of the present invention. Referring to FIG. 3, in step 300, a database administrator is prompted for a new data set transformation task. In 310, product and case rules are imported from a group benefits provider. In 320, a partner dataset version is ingested by the system, via secure file transfer or via the API. In 330, the data processing engine applies product and case transformation rules to the transformation, and transforms the data set in data format, schema, columns and values based on the product and case rules and stores the data set with a new version in at least one of the databases 140, 170 and 180. In 340, the system, via the API or otherwise, outputs the transformed data set version to the group benefits provider in the identified data type for that group benefits provider. In 350, the system, via the API otherwise, may output the transformed data set as another version in a data type or format associated with one of the benefits administration partners.

Figure 4:
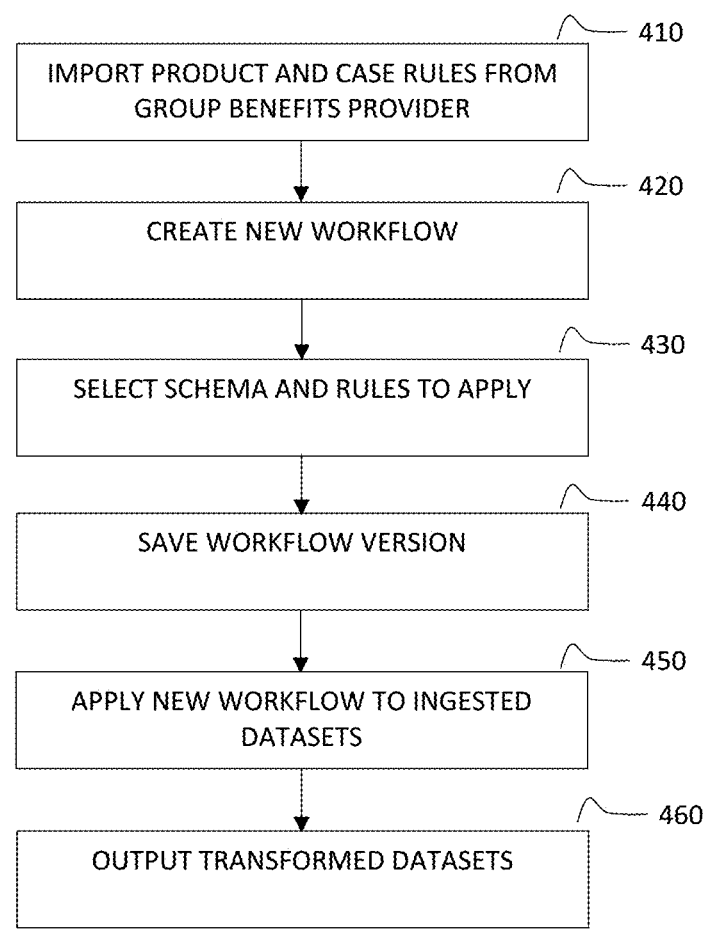
FIG. 4 depicts a method of building workflows and applying them to automated data processing tasks according to an embodiment of the present invention.

FIG. 4 depicts a method of building workflows and applying them to automated data processing tasks according to an embodiment of the present invention. Referring to FIG.

4, in 410, product and case rules are identified for a group benefits provider. In 420, an administrator 110 or 120 begins to create a new workflow via the API. In 430, the administrator selects schema and rules to apply to the workflow. The rules may be product rules or case rules and may describe, for example, how to convert values between formats to ensure compatibility and consistent treatment between a benefits administrator and a group benefits provider. In addition, other tasks may be included in the workflow to specify how files should processed according to the workflow. In 440, the workflow is saved in the database and associated with a provider in database 170 or 180.

In 450, via the API, an administrator may apply the new workflow, or a selected workflow, to data set versions. The automated data processing engine transforms the data using the applicable schema, rules and workflows. In 460, the data sets output from the engine are transformed and may be stored in the databases or output to an administrator.

Figure 5:
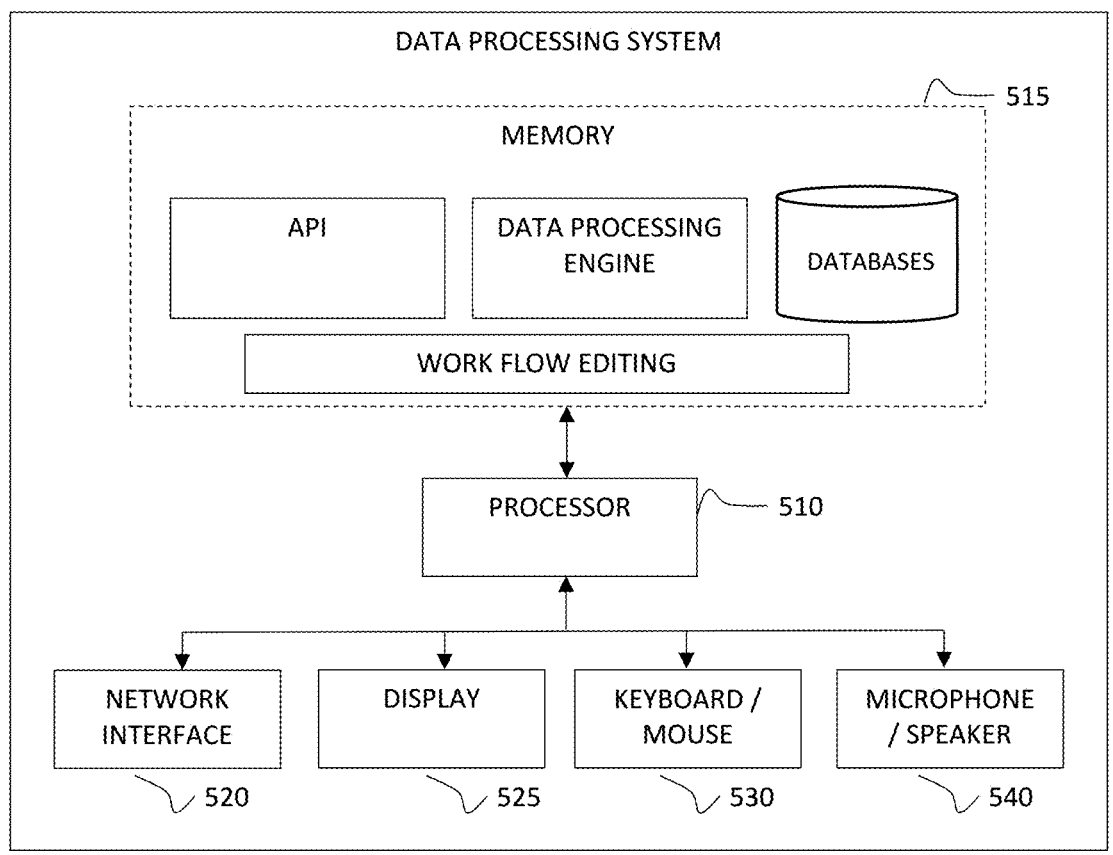
FIG. 5 depicts an automated data processing system according to an embodiment of the present invention.

FIG. 5 depicts a block diagram of an automated data processing system according to an embodiment of the present invention. Referring to FIG. 5, a data processing system according to an embodiment of the invention may include a processor 510, coupled to a memory 515, a network interface 520, a display 525, input/output devices such as a keyboard and mouse 530, and microphone/speaker 540. The memory stores programs and corresponding program instructions that, when executed by the computer 500, cause the computer to perform the data processing application and methods described herein. These programs also cause the computer to access the databases according to the methods and processes described herein. The memory may include an API program that allows users to launch data processing tasks and receive alerts when those tasks have been completed or when an error has been found during interrogation. The memory may further include a data processing engine, databases and a workflow editing program.

The administrators at computers 110, 120 and the administrator of the platform shown in FIG. 1 may use a computer as illustrated in this FIG. 5 to perform that data processing tasks described herein. The computer shown in FIG. 5 may be a server that the administrators access via a network and may be a distributed platform server, a cloud implemented server or any other implementation that provides computer based access to the functionality described herein.

The network interface 520 communicates via the internet and other networks with other computers and devices, wirelessly, electrically, optically, or in any other known manner. The display 525, keyboard/mouse 530 and microphone/speaker 540 may be used to administer the platform or system.

Figure 6:
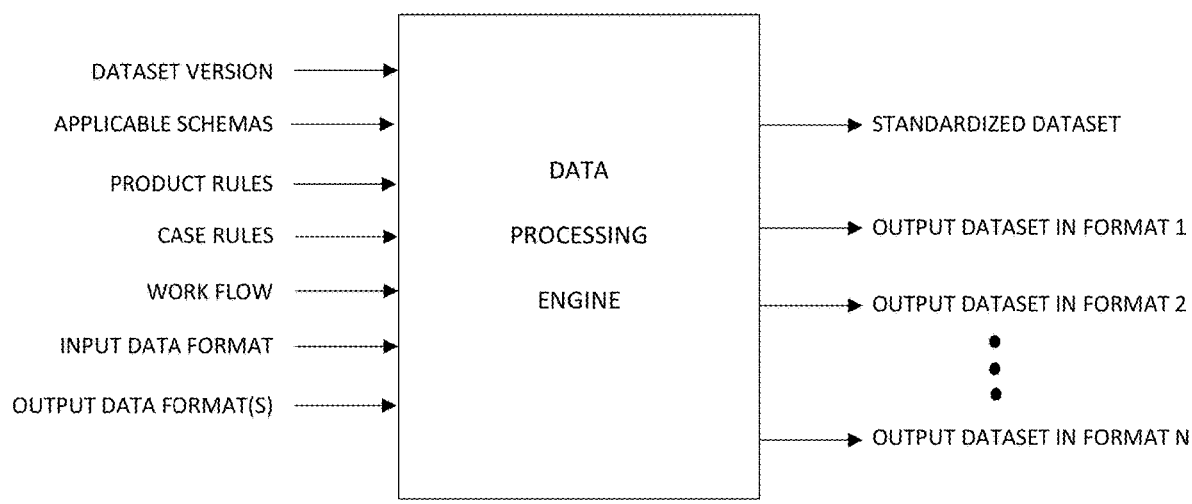
FIG. 6 depicts an illustrative view of data inputs and outputs associated with an automated data processing engine according to an embodiment of the present invention.

FIG. 6 depicts an illustrative view of data inputs and output used by an automated data processing engine according to an embodiment of the present invention. Referring to FIG. 6, the automated data processing engine shown and described herein is designed to ingest data set versions stored in different input data formats, different applicable schemas, different applicable product rules and case rules, different work flows. The engine then transforms the data sets based on all or some of those inputs into unique data set versions. In this manner, disparate data sets can be ingested into a platform, stored in a standardized manner uniquely tagged by version, stored in a non-standard legacy format uniquely tagged by version, and then sent to third parties or made available to third parties on the platform for processing, which maintaining version control.

While particular features of the invention have been shown and described herein, it will be understood by those having ordinary skill in the art that changes may be made to those embodiments without departing from the spirit and scope of the invention. For example, benefits administrators and group benefits providers have been described herein to illustrate an application of the automated data processing system. It will be understood that the invention may be applied to any system that involves sharing data that is stored in a myriad of disparate data formats.

What is claimed is:

1. A method of automated data processing between disparate data systems using different schema, comprising:
ingesting into memory, based on input from an administrator, a data set from a legacy database system with a schema that is stored having a first file type;
applying a version identifier to the data set;
interrogating the data set in memory without first migrating the dataset to another database to verify the schema;
transforming the data set into a standardized data set based on a standardized mapping and standardized data type;
interactively presenting an administrator with a work flow editor to enable an administrator to identify and modify rules applicable to the transforming of the data sets;
applying a version number to the standardized data set; and
outputting the data set into additional schema and data types based on interaction with the administrator;
wherein the administrator is alerted to errors in transformation and completed transformations via an interactive user interface.

2. The method of automated data processing according to claim 1, further comprising:
applying product rules and case rules stored uniquely for data set providers in the database to the transformation of data sets associated with respective providers.

3. The method of automated data processing according to claim 2, wherein the data type is JSON.

4. The method of automated data processing according to claim 2, wherein the data type is one of JSON, XML, .csv and pipe delimited.

5. A system for automated data processing between disparate data systems using different schema, comprising:
a processor;
a memory storing an automated data processing engine and an interactive API;
wherein the interactive API is coupled to the automated data processing engine and administrators at entities having disparate data systems;
provider databases coupled to the engine and the API storing schema, data set versions, rules, and workflows for each provider;
wherein the automated data processing engine is configured to (i) ingest into memory a data set from a legacy database system, based on input from an administrator via the API, with a schema and stored in a first file type; (ii) apply a version identifier to the data set; (iii) interrogate the data set to verify the schema in memory without first migrating the dataset to another database; (iv) transform the data set into a standardized data set based on a standardized mapping and standardized data type; (v) apply a version number to the standardized data set; (vi) output the data set into additional schema and data types based on interaction with the administrator;
wherein the API is configured to interactively present an administrator with a workflow editor to enable the administrator to identify and modify rules applicable to the transforming of the data sets; and wherein the API is further configured to interact with an administrator to alert the administrator to completed transformations via an interactive user interface.

6. The system according to claim 5, wherein the automated data processing engine is further configured to apply product rules and case rules stored uniquely for data set providers in the database to the transformation of data sets associated with respective providers.

7. The system according to claim 6, wherein the data type is JSON.

8. The system according to claim 6, wherein the data type is one of JSON, XML, .csv and pipe delimited.

* * * * *